US012267651B2

(12) United States Patent
Marcher

(10) Patent No.: US 12,267,651 B2
(45) Date of Patent: Apr. 1, 2025

(54) HANDLING TOOL FOR HEARING AID

(71) Applicant: Widex A/S, Lynge (DK)

(72) Inventor: Ib Marcher, Helsinge (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 17/908,716

(22) PCT Filed: Mar. 1, 2021

(86) PCT No.: PCT/EP2021/055086

§ 371 (c)(1),
(2) Date: Sep. 1, 2022

(87) PCT Pub. No.: WO2021/175798

PCT Pub. Date: Sep. 10, 2021

(65) Prior Publication Data

US 2023/0119781 A1 Apr. 20, 2023

(30) Foreign Application Priority Data

Mar. 2, 2020 (DK) ................................ 2020 00267

(51) Int. Cl.
*H04R 25/00* (2006.01)

(52) U.S. Cl.
CPC ....... *H04R 25/652* (2013.01); *H04R 2460/17* (2013.01)

(58) Field of Classification Search
CPC .... H04R 25/652; H04R 25/65; H04R 25/656; H04R 25/654; H04R 2460/17
USPC ........................................ 381/329, 312, 328
See application file for complete search history.

(56) References Cited

U.S. PATENT DOCUMENTS

| | | | | |
|---|---|---|---|---|
| 3,302,648 A * | 2/1967 | Nelson | A61B 17/2812 24/453 |
| 8,571,247 B1 * | 10/2013 | Oezer | H04R 25/00 381/328 |
| 9,161,142 B1 | 10/2015 | Wagner | |
| 2007/0009106 A1 * | 1/2007 | Tilson | H04R 25/654 381/60 |
| 2009/0285428 A1 | 11/2009 | Gilgert | |
| 2014/0150234 A1 | 6/2014 | Shennib et al. | |

FOREIGN PATENT DOCUMENTS

| | | | |
|---|---|---|---|
| DE | 20 2016 106 410 U1 | 11/2016 | |
| DE | 202018102158 U1 * | 10/2018 | H04R 25/00 |
| EP | 3 557 883 A1 | 10/2019 | |

OTHER PUBLICATIONS

International Search Report for PCT/EP2021/055086 dated May 11, 2021.
Written Opinion for PCT/EP2021/055086 dated May 11, 2021.
Danish Search Report for PA 2020 00267 dated Sep. 17, 2020.
Danish Written Opinion for PA 2020 00267 dated Sep. 17, 2020.

* cited by examiner

*Primary Examiner* — Ahmad F. Matar
*Assistant Examiner* — Sabrina Diaz
(74) *Attorney, Agent, or Firm* — Sughrue Mion, PLLC

(57) ABSTRACT

The invention relates to a tool for inserting an ear-tip of a hearing aid into an auditory canal of an end user. The tool comprises a first part and a second part, which are movable in relation to each other around at least one pivot joint. A cavity for receiving a holding portion of the ear-tip is provided between the first and the second part, which cavity is enlarged when a second portion of the first part and a second section of the second part are pressed together.

19 Claims, 13 Drawing Sheets

HANDLING TOOL FOR HEARING AID

CROSS REFERENCE TO RELATED APPLICATIONS

This application is a National Stage of International Application No. PCT/EP2021/055086 filed Mar. 1, 2021, claiming priority based on Danish Patent Application No. 2020 00267 filed Mar. 2, 2020.

TECHNICAL FIELD

The invention relates to a tool for inserting an ear-tip of a hearing aid into an auditory canal of an end user.

BACKGROUND

Today, a user has to insert an ear-tip of a hearing aid into an auditory canal manually. This has to be done with some precision, which can then be difficult as the ear-tip is quite small and therefore somewhat difficult to grasp and hold, especially for e.g. elderly people with poor dexterity. In addition, it is a known problem that users may have difficulty in placing the ear tip correctly in the ear, e.g. deep enough or at the correct angle, which may lead to a decrease in sound quality of the hearing aid, including feedback noise, or discomfort for the end user.

The problem to be solved is thus to provide a tool for inserting an ear-tip of a hearing aid into an auditory canal of an end user, which is easy and safe to use.

SUMMARY

According to an embodiment, this problem is solved by a tool for inserting an ear-tip of a hearing aid into an auditory canal of an end user, wherein the tool comprises a first part and a second part, and wherein an end of the first part and an end of the second part form a cavity for receiving a holding portion of the ear-tip. The first part and the second part are arranged next to each other and being connected by means of a pivot joint. The pivot joint defines a first portion and a second portion of both the first part and the second part, in that the first portions of the first part and the second part, respectively, extend from the ends comprising the cavity to the pivot joint. Similarly, the second portions of the first part and the second part, respectively, extend from the pivot joint to the ends opposite of the cavity along the longitudinal extension of the first part and the second part. The second portions of the first part and the second part are movable in relation to each other, and the first portions of the first part and the second part are movable in relation to each other, upon pressing the two second portions together in a direction perpendicular to the longitudinal extension of the first part and the second part, resulting in a pivotal movement via the pivot joint. The first portions of the first part and the second part forming the cavity are moved apart, thereby enlarging a cross-sectional area a of the cavity to release the holding portion of the ear-tip from the cavity.

The tool 1 has a longitudinal extension which is parallel to a longitudinal axis L as seen in FIG. 2*a*. This meaning to the term longitudinal extension of both the tool, the first part and the second part, is to be applied throughout this disclosure even though the longitudinal axis L is only shown in FIG. 2*a*.

A user can be a person using a hearing aid, i.e. an end user. In addition, a user can be a person handling the tool and/or the hearing aid, e.g. in a professional sense, a health care professional or an audiologist, or it can be a person assisting the end user in inserting the ear-tip and/or handling the hearing aid, e.g. a friend or relative.

When the ear-tip has contact with the auditory canal, a holding force between the auditory canal and the ear-tip is generated keeping the ear-tip in place in the auditory canal.

A tool according to the invention enables a user to firmly hold the holding portion in the cavity while at the same time ensuring easy release from tool when needed. In addition, the tool provides an object which is easier to hold in the hand compared to the holding portion itself and thus handle correctly.

The ear-tip is handled in different situations, e.g. when a health care professional demonstrates a hearing aid or instructs a user in using and maintaining the hearing aid. Other use situations include when a user replaces possible accessories of the ear tip, for example an ear wax guard or the ear tip itself which can be replaced by a fresh ear-tip, both of which are arranged on the holding portion. In these situations, the present invention provides a tool for easily and securely holding the ear-tip without blocking the parts that e.g. needs to be replaced or demonstrated.

According to an embodiment, the first portions of the first part and the second part extend between 5 and 35% of the total length of the longitudinal extension of the first part and the second part. This interval is selected to achieve a good balance between both the size of the tool and the increase in the cross-sectional area a needed to release the holding portion from the cavity. A more preferred interval is between 10 and 30% of the total length of the longitudinal extension of the first part and the second part, as this interval strikes a particularly good balance in that a tool with these proportions is both easy to use and carry.

According to an embodiment, at least one of the first part and the second part comprises a stopper portion, which is arranged outside of the cavity. The stopper portion is arranged on the tool such that the stopper portion abuts the concha of the ear of the end user when inserting the ear-tip in the auditory canal. Thus, the stopper portion prevents from inserting the ear-tip too deeply and provides the user with a clear indication of when the ear-tip is inserted deep enough in the auditory canal. Thus, the user will know exactly when the ear-tip has reached the correct position.

According to an embodiment, one of the first or second parts comprises a receiving gap. The receiving gap extends between the cavity and at least one stopper portion. The receiving gap is suitable for receiving a tube portion of the ear-tip. Thereby, the tube portion can easily be guided in the tool. Moreover, as the tube portion is preferably preformed according to the ear shape of the end user, the receiving gap facilitates to correctly orientate the ear-tip during insertion into the auditory canal.

According to an embodiment, at least one stopper portion comprises a guiding surface for guiding the tube portion of the ear-tip. The guiding surface further facilitates the guidance of the tube portion in the tool as well as the correct orientation of the ear-tip during insertion.

According to an embodiment, the second part is arranged within the perimeter of the first part. The relative movement of the first part and the second part is achieved by the deflection of the second part within the first part. An advantage of this particular embodiment is that exposed openings which may collect dirt or even pinch the user holding the tool are avoided.

A material that has the needed characteristics to be suitable for such deflection is preferably chosen for the tool 1. A preferred material is a thermoplastic, more preferred polyoxymethylene (POM). Polyoxymethylene is particularly preferred for precision parts such as the tool of the invention, as it has high stiffness, low friction, and excellent dimensional stability.

The first part may preferably be injection moulded in one piece. The second piece 20 may also be injection moulded in one piece.

According to an embodiment, the cavity is adapted to hold the holding portion of the ear-tip in such a way that the holding portion is supported in all three dimensions defined by a first axis X, a second axis Y and a third axis Z. This means that the holding portion is supported and cannot move in any direction along the first axis X, the second axis Y, or the third axis Z. It is particularly preferred that the end of the holding portion, which is adapted to be engaged in the cavity of the tool, is directly supported by the cavity in such a way that the opposite end of the holding portion is free of engagement with the tool. This is particularly useful in that the holding portion can carry ear-tips of different shapes and sizes, which can be chosen independently of the tool, as the tool only engages the end of the holding portion pointing outwards of the auditory canal of a user when the holding portion and the ear-tip are inserted correctly in the auditory canal during use of the hearing aid.

According to an embodiment, the cavity has a rectangular shape. The form of the holding portion of the ear-tip has also preferably a rectangular shape, which matches the rectangular shape of the cavity. The holding portion can thus be received in the cavity according to a key-lock-principle. This key-lock principle means that the holding portion and the cavity are adapted to be of complementary shape and size so as to perfectly match each other and preferably in such a way that the holding portion can only fit in the cavity in one certain orientation. This prevents a rotation of the holding portion within the cavity. Thus, the holding portion is always placed correctly in the tool, since the cavity will not match the holding portion and therefore not hold the holding portion if the holding portion is wrongly orientated. An advantage of this embodiment is therefore that ease of use is improved in that the user cannot place the holding portion incorrectly in the tool. This is important in that the tube portion of the ear-tip has to be orientated correctly for it to conform to the contours of the outer ear of the user when the hearing aid is in place on the user and in use.

According to an embodiment, an edge of the rectangular shape is rounded. The rounded edge facilitates the removing of the tool from the holding portion but maintains the key-lock-principle. Preferably, all edges of a respective shape are rounded. Edges as mentioned in this application relate to the edges of the cavity and/or the holding portion.

According to an embodiment, the cavity comprises at least one recess for receiving a protrusion, which is arranged on the holding portion of the ear-tip. If the protrusion is received in the recess, an unintentional removal of the tool from the ear-tip can be prevented. Moreover, a rotation of the holding portion within the ear-tip can be prevented, too. Preferably, the engagement between the holding portion and the tool is provided between the cavity, comprising the at least one recess, and the end of the holding portion, comprising the protrusion, which is adapted to be engaged in the cavity of the tool, respectively.

According to an embodiment of the invention, a force needed for pressing together the second portions of the first part and the second part, thereby releasing the holding portion of the ear-tip from the cavity, is 5-20 N. This interval is selected to strike a balance between a firm and secure hold of the holding portion in the cavity and the force needed to be applied by e.g. a user's fingers to release the holding portion from the cavity in a use situation. Users of the tool may vary greatly, e.g. with respect to the strength of their hands and the dexterity, as for example an end user may be an elderly person with decreased strength in his/her hands as well as maybe poor dexterity. The interval of 5-20 N is selected with this balance in mind. A more preferred interval is 10-17 N.

According to an embodiment of the invention, the cross-sectional area $\alpha$ of the cavity is enlarged by 50-150% upon application of said force, preferably 70-100%. An advantage of this embodiment is that a sufficient clearance between the holding portion and the cavity is achieved so that the user is able to easily release the holding portion from the cavity.

According to an embodiment of the invention, the first part or the second part comprises a raised portion. One of the advantages of this raised portion 26 is that it indicates to the user an advantageous place to place e.g. a thumb when holding the tool in a hand.

According to a second aspect of invention, a set for inserting an ear-tip in an auditory canal of an end user is provided which comprises an ear-tip, having a holding portion; and the tool of any one of the preceding embodiments.

According to an embodiment, the form of the holding portion matches into the shape of the cavity. The form of the holding portion of the ear-tip has also preferably a rectangular shape, which matches the rectangular shape of the cavity. The holding portion can thus be received in the cavity according to a key-lock-principle. This prevents a rotation of the holding portion within the cavity.

BRIEF DESCRIPTION OF THE DRAWINGS

The accompanying drawings, which are included to provide further understanding, illustrate disclosed aspects and together with the description serve to explain the principles of the disclosed aspects.

DETAILED DESCRIPTION

Figure 1:
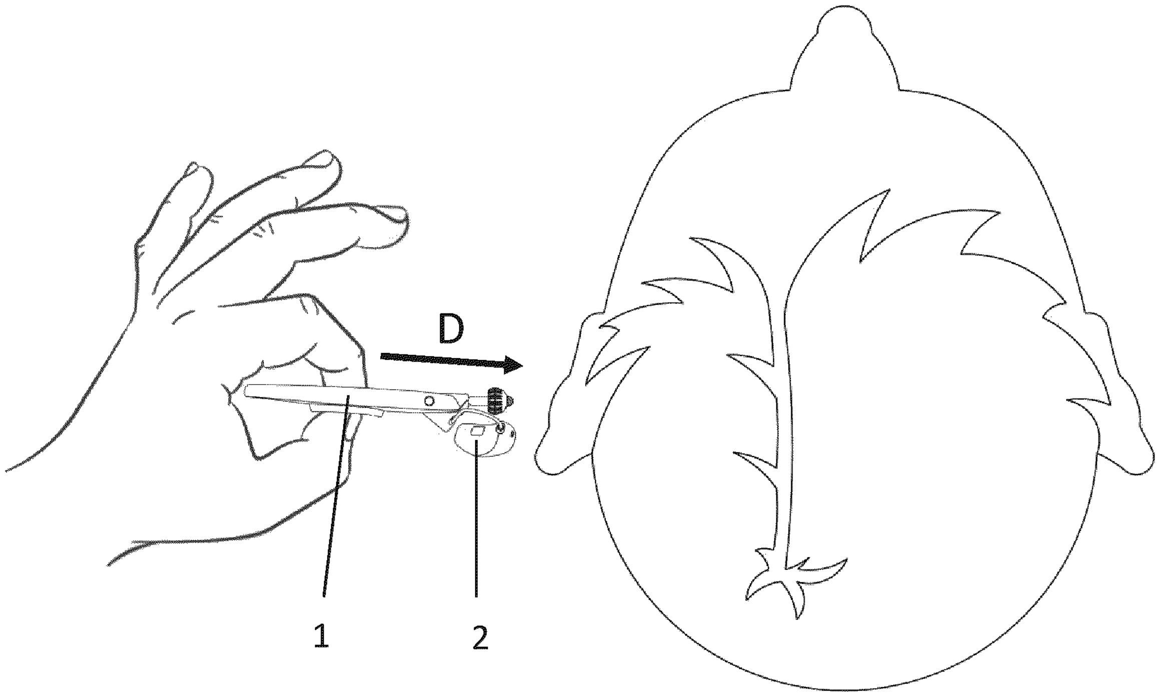
FIG. 1 is a top view of a user in a use situation with a tool according to the present disclosure and a hearing aid.

FIG. 1 is a top view of a user in a use situation with a tool 1 according to the present disclosure. The tool 1 receives and holds a holding portion of an ear-tip of a hearing aid 2. Here it is shown how the user can hold the ear-tip of the hearing aid 2 with the tool and use it to position it correctly when inserting it into the auditory canal of the end user. The direction of insertion is indicated by D.

Figure 2A:
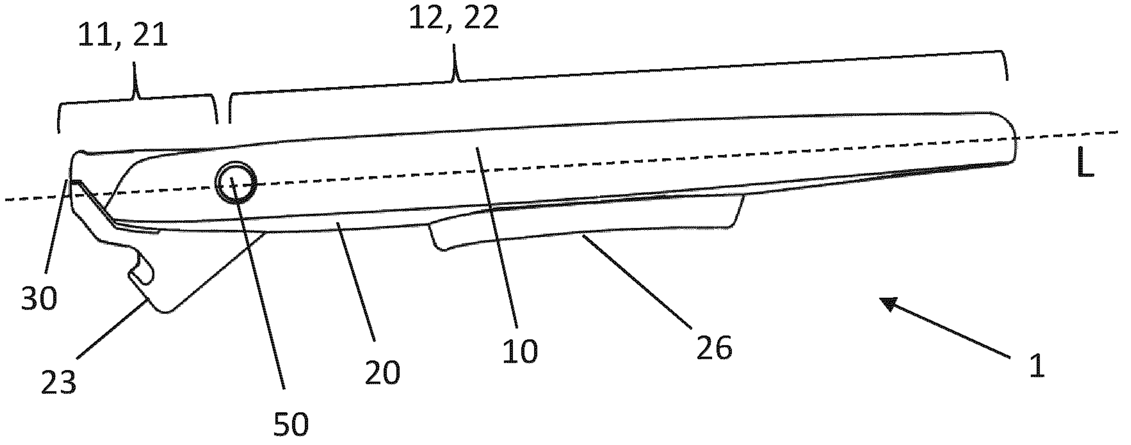
FIG. 2*a* is a side view of the tool of FIG. 1.

FIG. 2*a* is a side view of the tool 1 of FIG. 1. The first part 10 is shown as the upper part, and the second part 20 is shown as the lower part. The tool 1 has a longitudinal extension which is parallel to a longitudinal axis L as seen in FIG. 2*a*. This meaning to the term longitudinal extension of both the tool 1, the first part 10 and the second part 20, is to be applied throughout this disclosure even though the longitudinal axis L is only shown in FIG. 2*a*. The second part 20 comprises a raised portion 26 indicating to the user an advantageous place to place e.g. a thumb when holding the tool 1 in a hand. Further, the stopper portion 23 is shown, which stopper portion 23 is provided to about the concha when the ear-tip 40 (not shown) has reached the appropriate position in the auditory canal of an end user, providing a tactile feedback to the user inserting the ear-tip as well as the end user, in the case they are two different persons. In addition to providing this tactile feedback, the stopper portion 23 also prevents the user from inserting the ear-tip 40 too deeply in the auditory canal in that there is not room in the auditory canal to insert the stopper portion 23 further than the concha.

The first part 10 and the second part 20 are connected by means of a pivot joint 50. The pivot joint 50 defines a first portion 11, 21 and a second portion 12, 22 of both the first part 10 and the second part 20 in that the first portions 11, 21 of the first part 10 and the second part 20, respectively, extend from the ends comprising the cavity 30 to the pivot joint 50, and the second portions 12, 22 of the first part 10 and the second part 20, respectively, extend from the pivot joint 50 to the ends opposite of the cavity along the longitudinal extension of the first part 10 and the second part 20.

The first portions 11, 21 of the first part 10 and the second part 20, respectively, and the second portions 12, 22 of the first part 10 and the second part 20, respectively, can move relatively to each other around a central axis of the pivot joint 50. The embodiment shown in the figures comprises two pivot joints 50 arranged coaxially, i.e. the central axis of one pivot joint 50 coincides with a central axis of the other pivot joint 50. From the perspective in FIG. 2*a*, only one of the pivot joints 50 is visible.

Figure 2B:
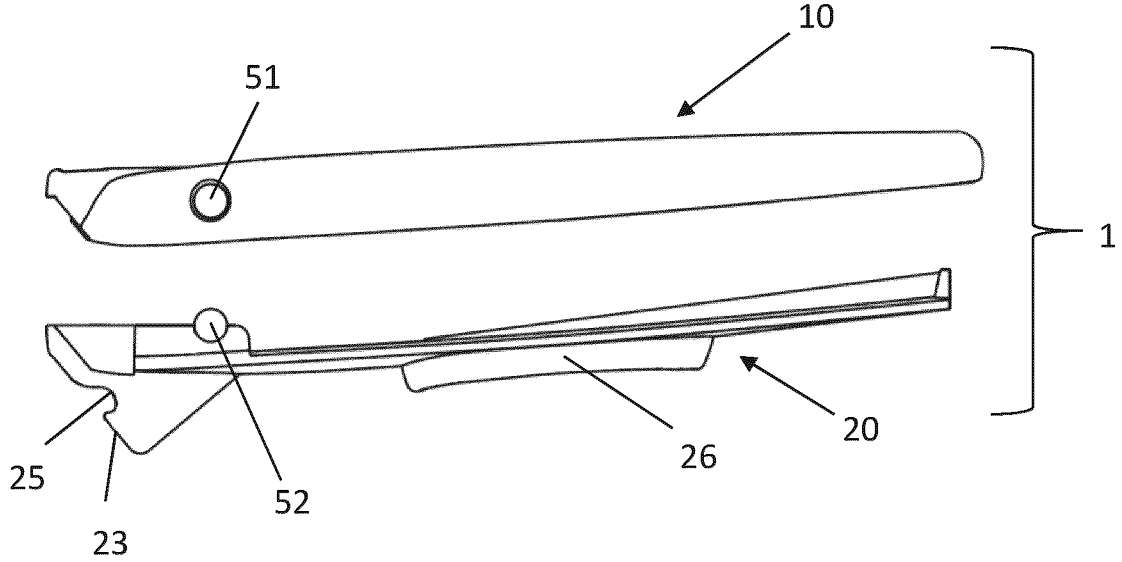
FIG. 2*b* is an exploded side view of the tool of FIG. 2*a*.

FIG. 2*b* is an exploded side view of the tool of FIG. 2*a*. In FIG. 2*b* the cooperating elements of the pivot joint are shown. The first part 10 comprises a circular hole 51 arranged to receive and cooperate with a circular pivot element 52 of the second part 20. The circular pivot element 52 is provided as a protrusion on the second part 20. The second part 20 comprises the stopper portion 23 which is provided with a guiding surface 25 to accommodate a tube portion 44 (not shown).

For clarity, it is noted that the embodiments shown in all the figures comprises two pivot joints, but as only one pivot joint is visible in multiple figures, the description for these particular figures will refer to the pivot joint, the circular hole and the circular pivot element, the same description applying to both pivot joints 50, circular holes 51, and circular pivot elements 52.

Figure 3A:
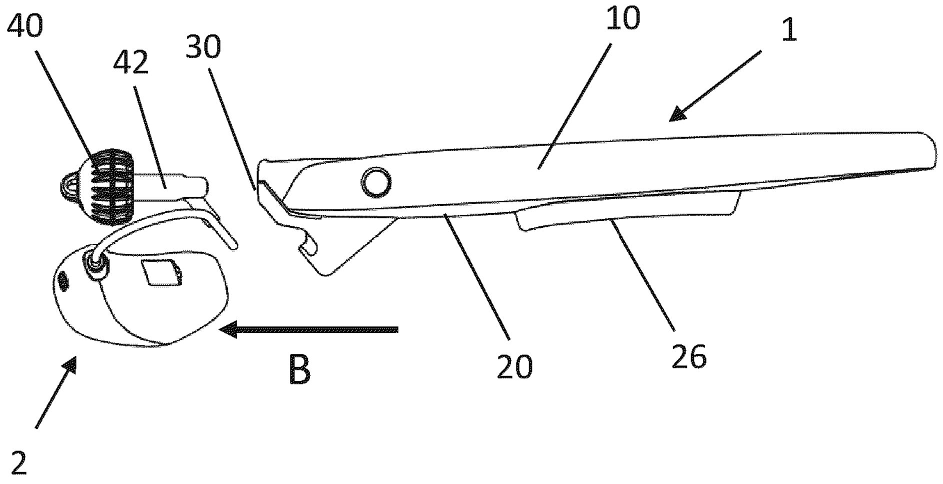
FIG. 3*a* is an exploded side view of a hearing aid and the tool of FIG. 1.

FIG. 3*a* is an exploded side view of a hearing aid and the tool of FIG. 1. The tool 1 comprises the first part 10 and the second part 20. The second part 20 comprises a raised portion 26. The hearing aid 2 is shown separate from the tool 1, i.e. the holding portion 42 has not yet been placed in the cavity 30 of the tool 1 or it has been released from the cavity 30. The direction of release from the cavity is indicated by arrow B.

Figure 3B:
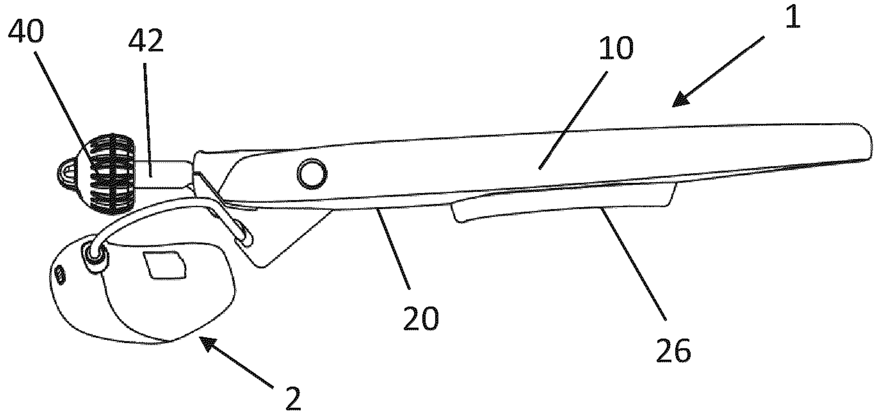
FIG. 3*b* is a side view of the tool of FIG. 3*a* with the ear-tip being received in the cavity of the tool.

FIG. 3*b* is a side view of the tool of FIG. 3*a*. FIG. 3*b* shows the tool 1 with holding portion 42 of the ear-tip 40 being received in the cavity 30 of the tool 1. When the hearing aid 2 is connected to the tool 1 in this way, the ear-tip 40 can e.g. be exchanged, while the tool 1 firmly holds the holding portion 42 in place in the cavity. Such exchange is a normal procedure, as the ear-tip 40 can get partly or fully covered with e.g. ear wax, resulting in a decreased performance of the hearing aid 2 as perceived by the end user. The same functionality applies if a user needs to replace a wax guard (not shown) of the hearing aid, which wax guard is placed under the ear-tip on the holding portion 42.

Figure 4:
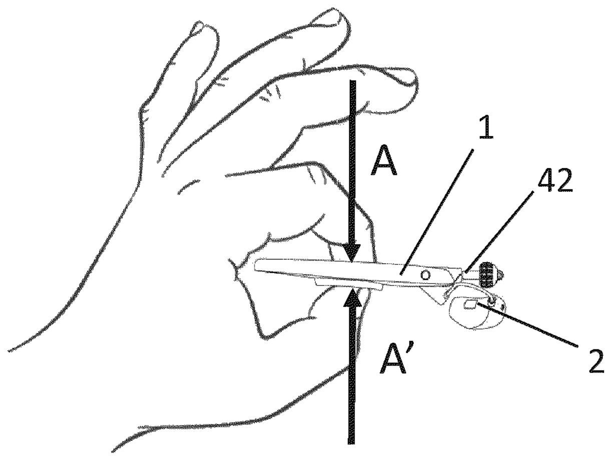
FIG. 4 is a perspective view of a hand holding the tool of FIG. 1 holding an ear-tip of a hearing aid.

FIG. 4 is a perspective view of a hand holding the tool of FIG. 1 holding the holding portion 42 of an ear-tip of a hearing aid 2. The arrows A and A' indicate the direction of the force to be applied to move the first part and the second part relatively to each other via a pivot joint. The second portion of the second part 20 is deflected, e.g. when a user presses on the raised portion 26 with a thumb and supports the first part 10 with e.g. another finger, i.e. a pressing motion is applied to the tool, as indicated by the arrows A and A'. This deflection of the second portion of the second part 20 of the tool 1 results in the ends of the first portions of the first part 10 and the second part 20, respectively, which first portions form the cavity 30, are moved apart. Thereby, the cavity 30 no longer holds the holding portion 42 which is thus released from the tool 1. Similarly, when the holding portion 42 is to be placed in the cavity 30, e.g. prior to insertion into the auditory canal of an end user, the second portions of the first part 10 and the second part 20 may be moved relatively to each other by application of force in the directions of A and A'.

Figure 5:
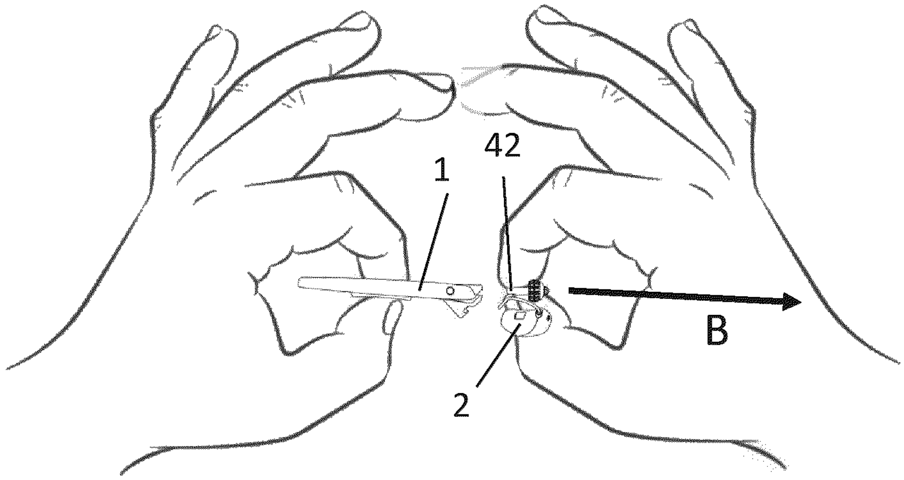
FIG. 5 is a perspective view of two hands holding the tool of FIG. 1 and a hearing aid, respectively.

FIG. 5 is a perspective view of two hands holding the tool of FIG. 1 and a hearing aid 2, respectively. The arrow B denotes the direction of release of the holding portion 42 from the tool 1. In FIG. 5, the hearing aid 2 with the ear-tip 40 is separate from the tool 1. The direction of placing the holding portion 42 in the cavity 30 of the tool 1 is opposite of the direction B as shown in FIG. 5. If the second portions of the first part 10 and the second part 20, respectively, are not moved relatively to each other, and the cross-sectional area $\alpha$ of the cavity 30 is thus not enlarged, the cavity 30 will hold the holding portion 42 of the ear-top up until a pulling force in the direction B of 5-20 N, preferably 10-17 N, is applied, whereby the holding portion 42 will be released from the cavity 30.

Figure 6A:
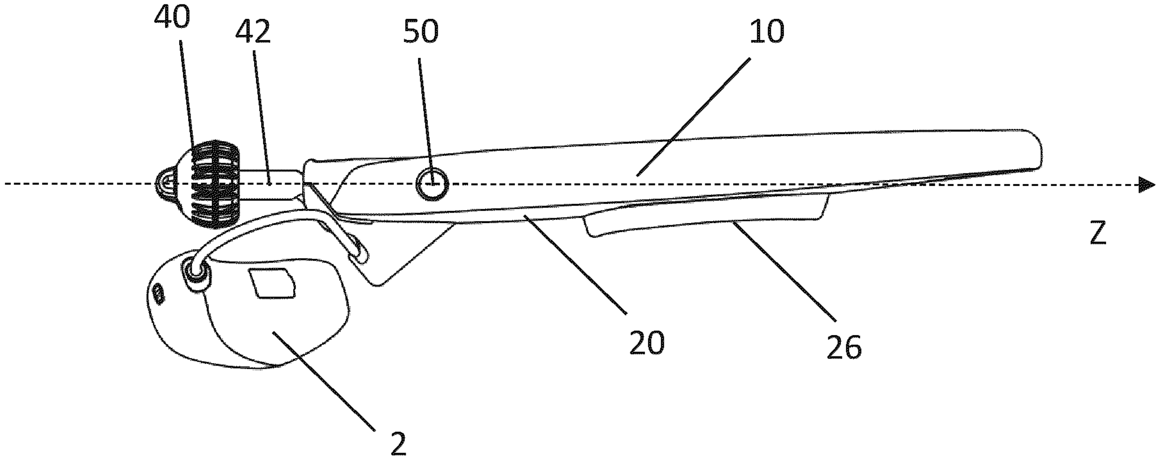
FIG. 6*a* is a side view of the tool of FIG. 1 with the ear-tip being received in the cavity of the tool.

FIG. 6*a* is a side view of the tool of FIG. 3*a*. FIG. 3*b* shows the tool 1 with holding portion 42 of the ear-tip 40 of a hearing aid 2 being received in the cavity 30 of the tool 1. The tool 1 comprises the first part 10 and the second part 20 and two pivot joints 50, only one of which is visible in this figure. The second part 20 comprises a raised portion 26.

In FIG. 6*a*, the tool 1 is in a relaxed condition, i.e. the second portions of the first part 10 and the second part 20, respectively, and the first portions of the first part 10 and the second part 20, respectively, have not been moved in relation to each other. Thus, the cavity firmly holds the holding portion 42 of the ear-tip 40 and is ready for insertion, demonstration or maintenance of the ear-tip 40. FIG. 6*a* also shows the third axis Z indicative of a dimension in which the ear-tip is held in place in relation to the tool in such a way that the ear-tip 40 comprising the holding portion 42 cannot move in relation to the tool in a direction along the third axis Z.

Figure 6B:
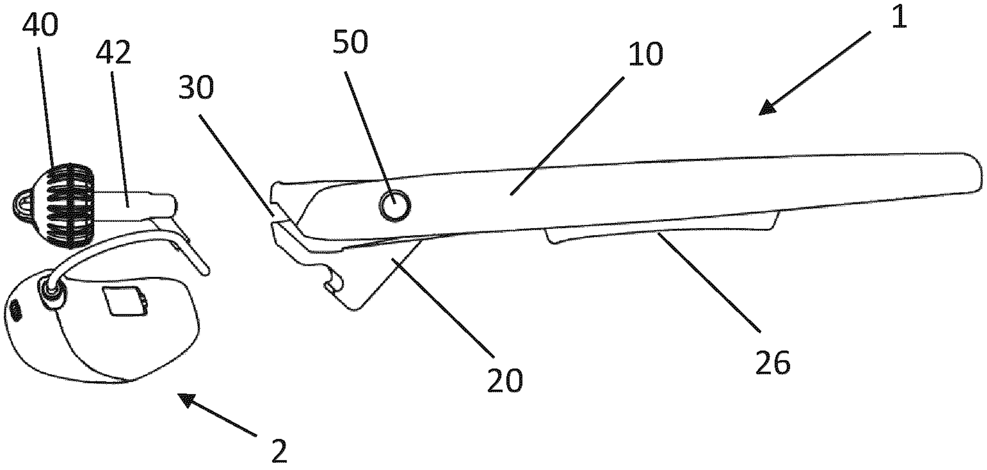
FIG. 6*b* is an exploded side view of a hearing aid and the tool of FIG. 1, with the ear-tip being removed from the tool.
Figure 9A:
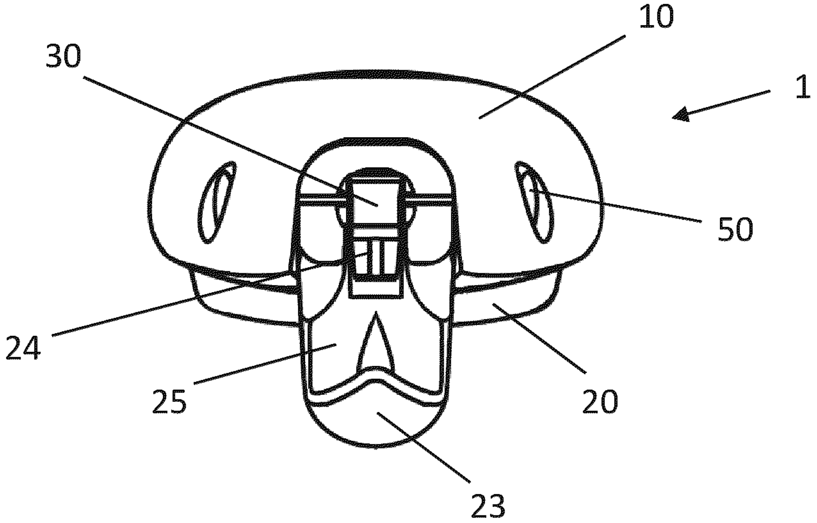
FIG. 9*a* is a front view of the tool of FIG. 1.
Figure 9B:
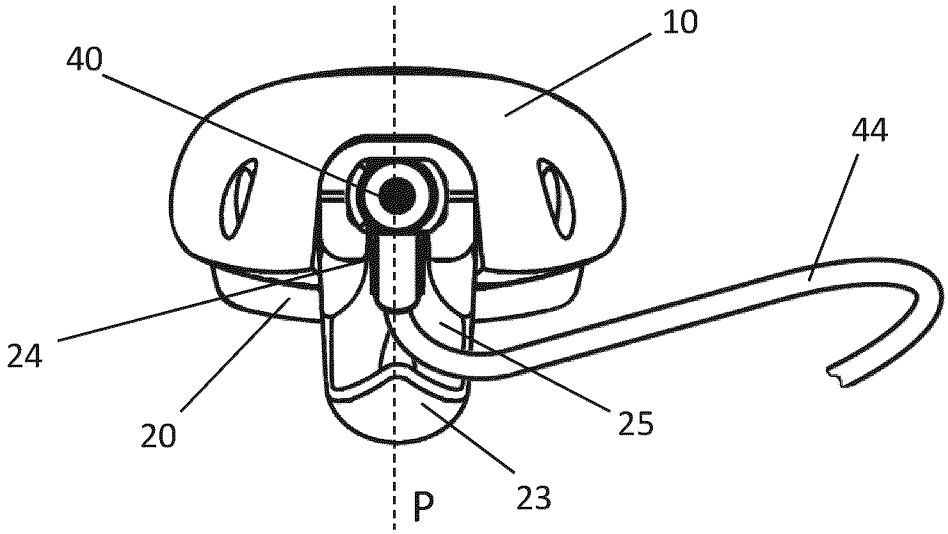
FIG. 9*b* is a front view of the tool of FIG. 1 and showing a partial of the ear-tip of a hearing aid received in the cavity of the tool.
Figure 9C:
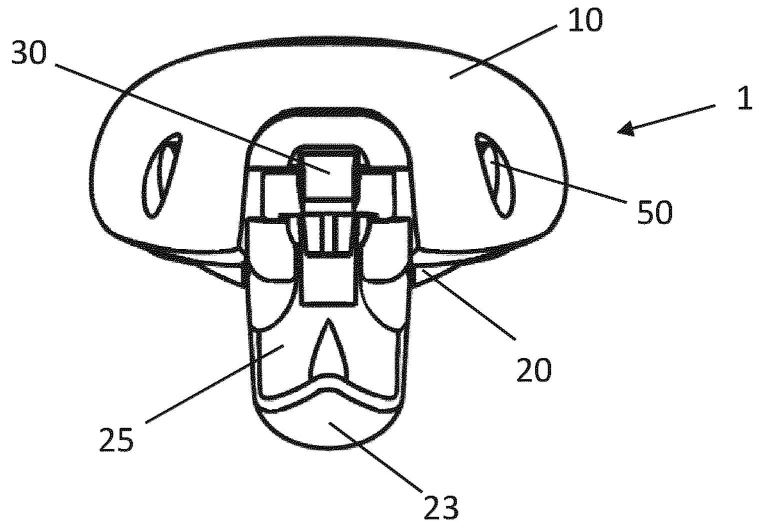
FIG. 9*c* is a front view of the tool of FIG. 1.
Figure 9D:
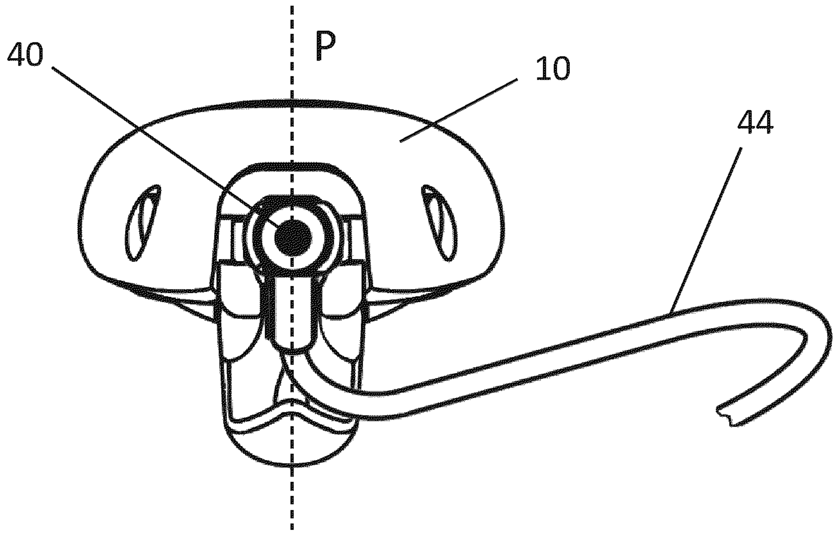
FIG. 9*d* is a front view of the tool of FIG. 1 and showing a partial view of the ear-tip of a hearing aid.

FIG. 6*b* is an exploded side view of a hearing aid 2 and the tool 1 of FIG. 1, wherein the cavity 30 is enlarged to release the holding portion 42 of the ear-tip 40. The second portion 22 of the second part 20 is deflected as a result of an applied force on the first part 10 and the second part 20 as indicated by A and A' in FIG. 4. This deflection of the second portion 22 of the second part 20 of the tool 1 results in the ends of the first portion 11, 21 of the first part 10 and the second part 20, respectively, which first portions 11, 21 form the cavity 30, are moved apart. Thereby, the cross-sectional area α of the cavity 30 (as best seen in FIGS. 9*c* and 9*d*) is enlarged as compared to when the tool 1 is in a relaxed condition (as best seen in FIGS. 9*a* and 9*b*). In this condition, the cavity 30 will no longer hold the holding portion 42 (not shown) of the ear-tip 40 (not shown) which is thus released from the tool 1. Therefore, the hearing aid 2 comprising the ear-tip 40 and the holding portion 42 is shown separate from the tool 1.

From the side view of FIG. 6*b*, it can be seen how the second portion 22 of the second part 20 is deflected and received within the second portion 12 of the first part 10. The raised portion 26 of the second part 20 is likewise partly received within the second portion of the first part and is thus only partly visible in FIG. 6*b*.

Figure 7A:
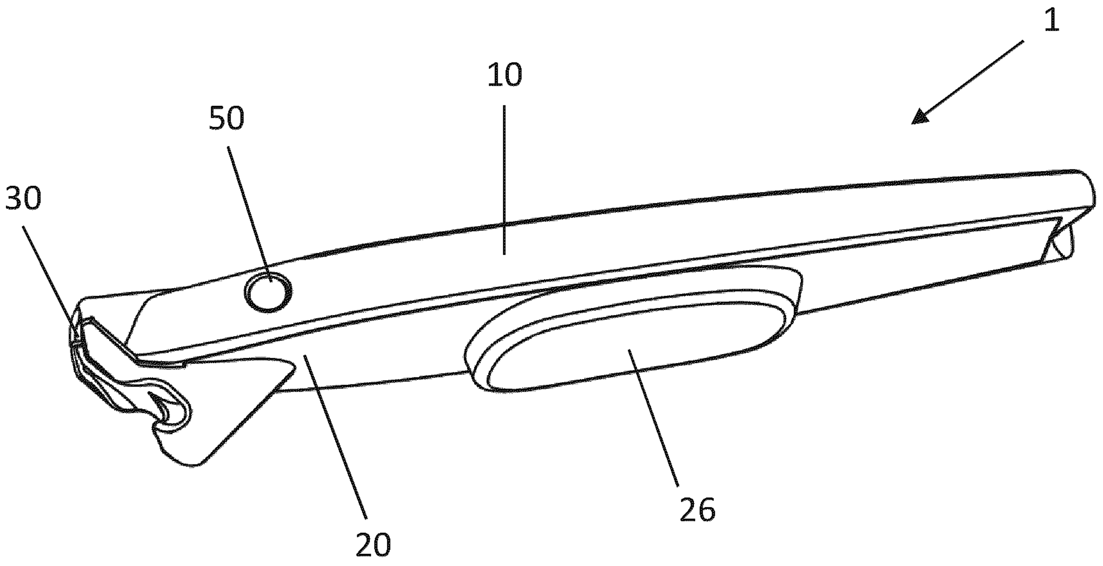
FIG. 7*a* is a perspective view of the tool of FIG. 1 in a relaxed condition.

FIG. 7*a* is a perspective view of the tool of FIG. 1 in a relaxed condition with the cavity 30 formed between the first part 10 and the second part 20. The first part 10 of the tool 1 is shown as the upper part, and the second part 20 is shown as the lower part. The second part 20 comprises a raised portion 26 for advantageously placing a thumb for easy handling of the tool 1 and thereby the ear-tip 40 (not shown). It is also shown that the second part 20 is arranged within the perimeter of the first part 10 and accommodated in the first part 10 in a plane that coincides with the drawing plane of FIG. 8*b*. The pivot joint 50 connecting the first part 10 and the second part 20 enables a relative movement between the second sections of the first part 10 and second part 20, respectively, and the first sections of the first part 10 and the second part 20, respectively.

Figure 7B:
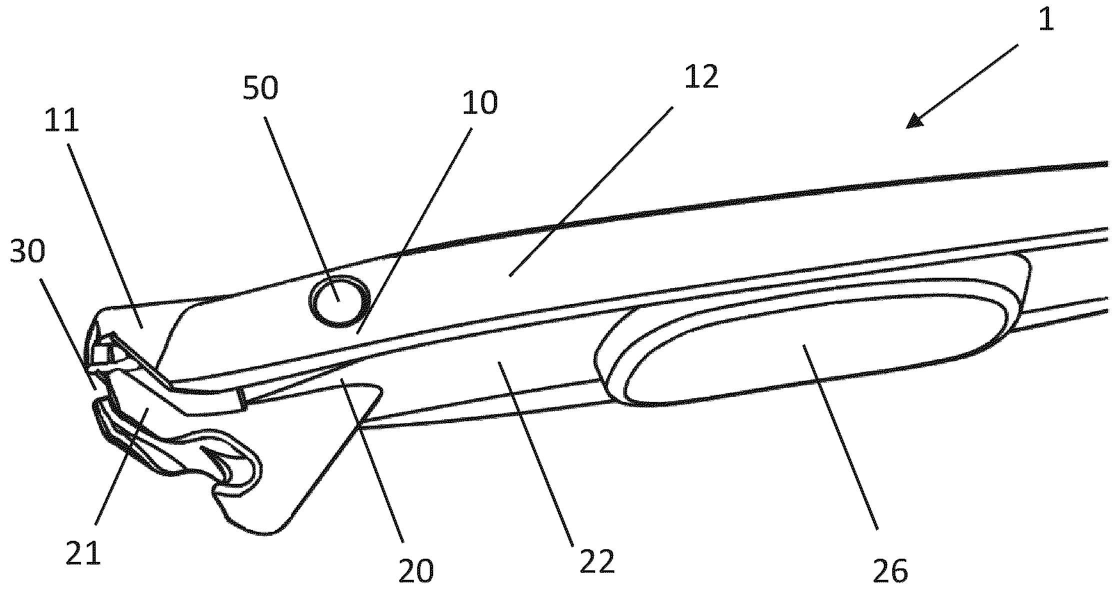
FIG. 7*b* is a partial, perspective view of the tool of FIG. 7*a*, where the second portion of the second part is deflected.

FIG. 7*b* is a partial, perspective view of the tool of FIG. 7*a*, where the second portion 22 of the second part 20 is deflected. This deflection of the second portion 22 of the second part 20 of the tool 1 results in the ends of the first portions 11, 21 of the first part 10 and the second part 20, respectively, which first portions 11, 21 form the cavity 30, are moved apart. Thereby, the cross-sectional area α of the cavity 30 (as best seen in FIGS. 9*c* and 9*d*) is enlarged as compared to when the tool 1 is in a relaxed condition (as best seen in FIGS. 9*a* and 9*b*). In this condition, the cavity 30 will no longer hold the holding portion 42 (not shown) of the ear-tip 40 (not shown) which is thus released from the tool 1.

Figure 8A:
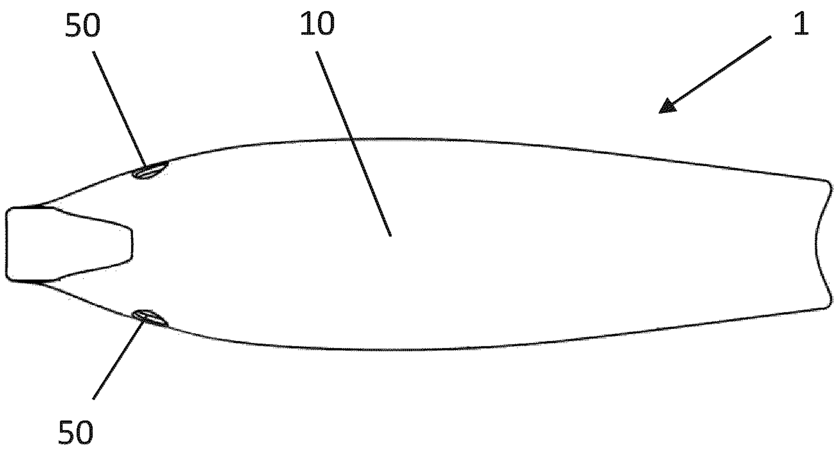
FIG. 8*a* is a top view of the tool of FIG. 1.

FIG. 8*a* is a top view of the tool of FIG. 1. The first part 10 is shown, while the second part 20 is not seen, as the first part is covering the second part 20 as seen from this perspective. Two pivot joints 50 are shown, connecting the first part 10 and the second part 20, and enabling the first part 10 and the second part 20 to pivot around the pivot joints 50. The pivot joints 50 are placed coaxially on an axis perpendicular to the longitudinal axis L of the tool as seen in FIG. 2*a*.

Figure 8B:
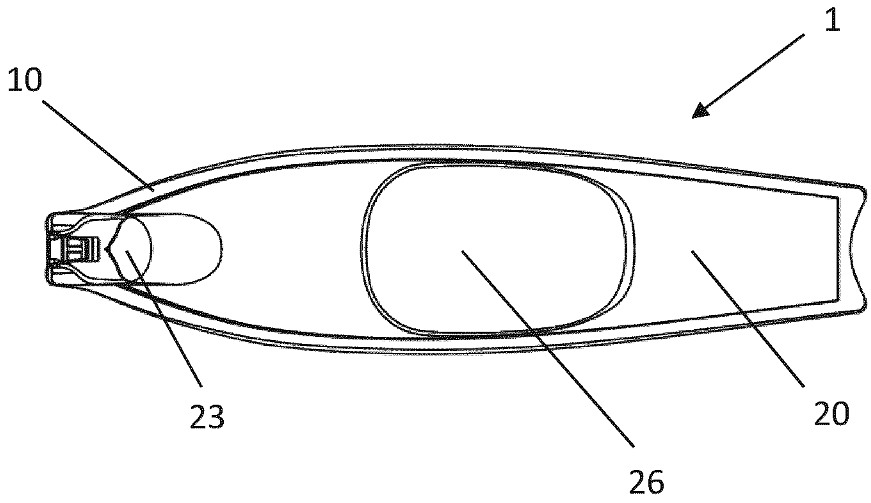
FIG. 8*b* is a bottom view of the tool of FIG. 1.

FIG. 8*b* is a bottom view of the tool of FIG. 1. The first part 10 and the second part 20 comprising the raised portion 26 and the stopper portion 23 are shown.

FIG. 9*a* is a front view of the tool of FIG. 1. The first part 10 of the tool 1 is shown as the upper part, and the second part 20 is shown as the lower part. A receiving gap 24 and a guiding surface 25 is provided as part of the second part 20 to accommodate a tube portion 44 (not shown). In FIG. 9*a*, the tool 1 is in a relaxed condition, i.e. the second portions of the first part 10 and the second part 20, respectively, have not been moved in relation to each other. Thus, the cavity 30 has a cross-sectional area α which matches the shape and size of the holding portion 42 (not shown) to be able to firmly receive and hold the holding portion 42 (not shown) in the cavity 30. The cross-sectional area α is the area of the cavity 30 as visible in FIGS. 9*a*-9*d*, i.e. the plane of the cross-sectional area α coincides with the drawing plane of FIGS. 9*a*-9*d*.

As can be seen in FIGS. 9*b* and 9*d*, the tube portion 44 is received in the receiving gap 24 and is guided by a guiding surface 25. Moreover, the tube portion 44 is guided through a region between the cavity 30 and the stopper portion 23 being formed as a recess to allow the tube portion 44 of the ear-tip 40 to extend in an angle to the basic plane P. In FIG. 9*b*, as in FIG. 9*a*, the tool 1 is in a relaxed condition, i.e. the second portions of the first part 10 and the second part 20, respectively, have not been moved in relation to each other. Thus, the cavity 30 has a cross-sectional area α which matches the shape and size of the holding portion 42 (not clearly visible) to firmly receive and hold the holding portion 42 in the cavity 30. The cross-sectional area α is the area of the cavity 30 as visible in FIGS. 9*a*-9*d*, i.e. the plane of the cross-sectional area α coincides with the drawing plane of FIGS. 9*a*-9*d*.

FIG. 9*c* is a front view of the tool of FIG. 1 where the second portion of the second part 20 is deflected, and the cross-sectional area α of the cavity 30 is therefore enlarged as compared to when the tool 1 is in a relaxed condition as in FIGS. 9*a* and 9*b*.

FIG. 9*d* is a front view of the tool of FIG. 1 and showing a partial view of the ear-tip 40 of a hearing aid received in the cavity 30 of the tool 1, where the second portion of the second part 20 is deflected, e.g. when a user presses on the raised portion 26 with a thumb and supports the first part 10 with e.g. another finger, i.e. a pressing motion is applied to the tool as indicated by the arrows A and A' in FIG. 4. This deflection of the second portion of the second part 20 of the tool 1 results in the ends of the first portions of the first part 10 and the second part 20, respectively, which first portions form the cavity 30, are moved apart. Thereby, the cross-sectional area α of the cavity 30 is enlarged as compared to when the tool 1 is in a relaxed condition, as in FIGS. 9*a* and 9*b*, and the cavity 30 no longer holds the holding portion 42 which is thus released from the tool 1.

Figure 9E:
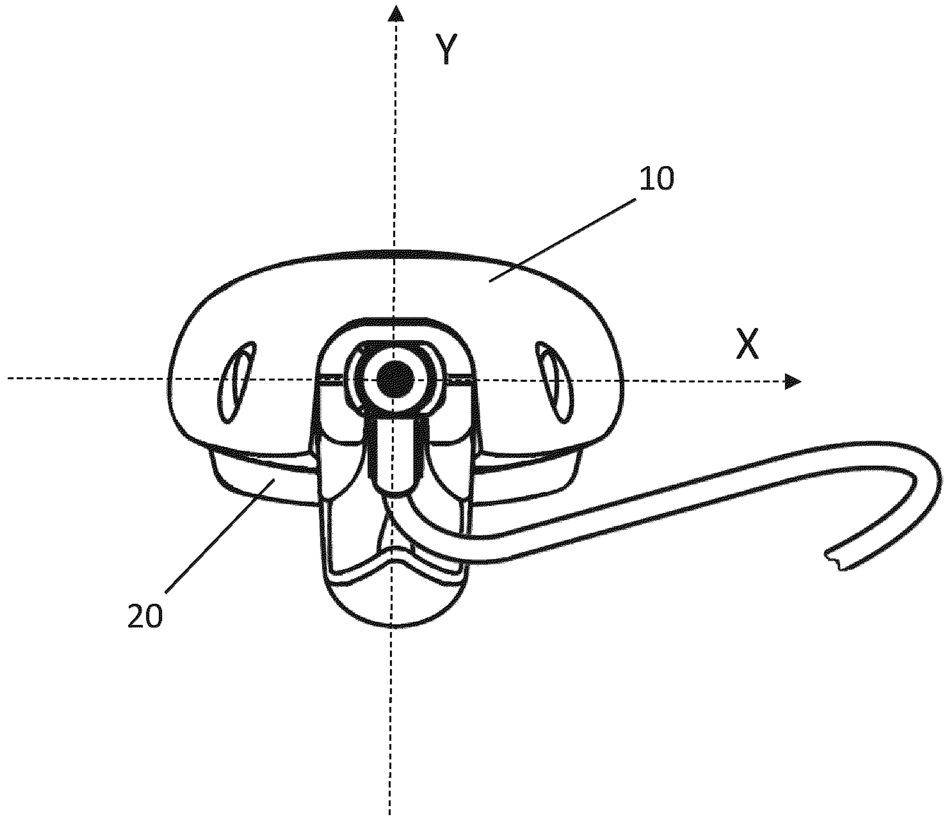
FIG. 9*e* is a front view of the tool of FIG. 1 and showing a partial of the ear-tip of a hearing aid received in the cavity of the tool.

In FIG. 9*e*, as in FIGS. 9*a* and 9*b*, the tool 1 is in a relaxed condition, i.e. the second portions of the first part 10 and the second part 20, respectively, have not been moved in relation to each other. Thus, the cavity 30 (not clearly visible) has a cross-sectional area α which matches the shape and size of the holding portion 42 (not clearly visible) to firmly receive and hold the holding portion 42 in the cavity 30. In FIG. 9*e*, the first axis X and the second axis Y are shown, indicative of two dimensions in which the ear-tip is held in place in relation to the tool in such a way that the ear-tip 40 comprising the holding portion 42 cannot move in relation to the tool in directions along any of the first axis X or the second axis Y.

Figure 10:
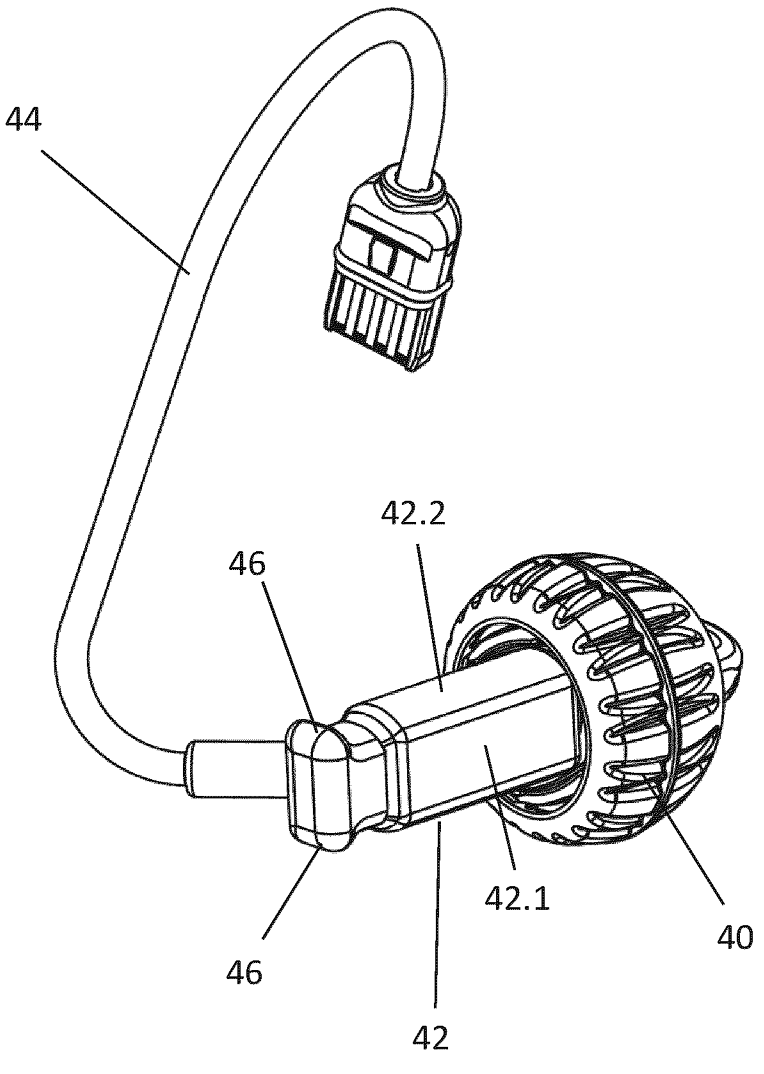
FIG. 10 is a perspective view of an ear-tip of a hearing aid.

FIG. 10 is a perspective view of an ear-tip 40 comprising a holding portion 42, which is to be received within the cavity 30 (not shown). Moreover, the ear-tip 40 comprises a tube portion 44 for connecting the ear-tip 40 to a hearing aid (not shown).

Figure 11:
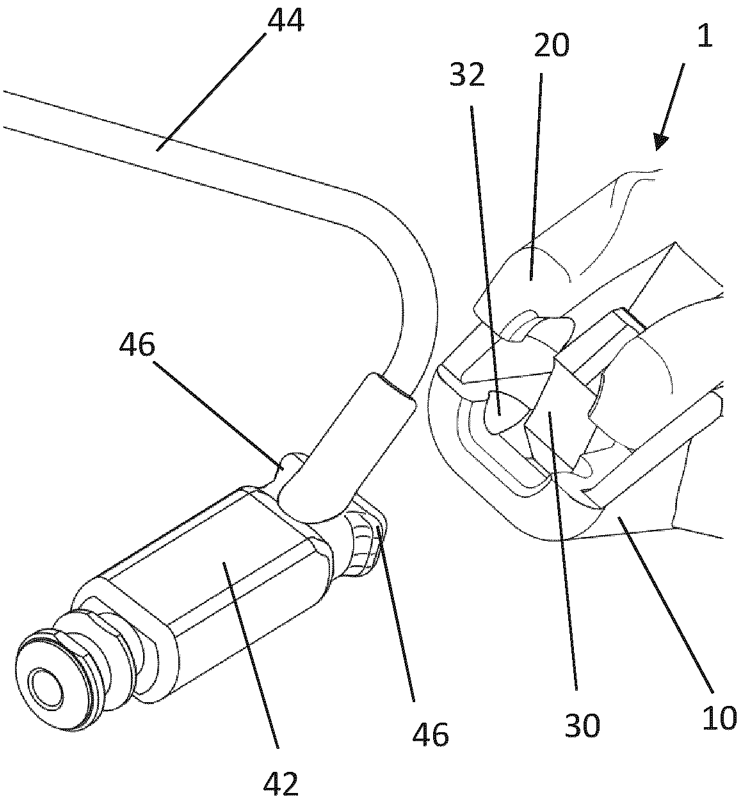
FIG. 11 is a partial, perspective view of the tool of FIG. 1 and a holding portion 42 with a partial tube section 44.

The holding portion 42 is in FIG. 10 preferably formed as a substantially rectangular cuboid with rounded edges. Thus, the holding portion 42 matches into the rectangular shape of the cavity 30 which is shown in FIG. 11. FIG. 10 shows in detail one of the protrusions 46, the largest side surface 42.1, and the long narrow side surface 42.2. Furthermore, the largest side surface 42.1 of the rectangular rounded cuboid is shown in FIG. 10. The holding portion 42 comprises two protrusions 46, which are arranged on the two long narrow side surfaces 42.2 of the rectangular rounded cuboid.

FIG. 11 is a partial, perspective view of the tool of FIG. 1. In addition, a holding portion 42 with a partial tube section 44 is shown. The cavity 30 is formed between the first part 10 and the second part 20, the cavity comprising at least one recess 32 for receiving the protrusions 46 of the holding portion.

Figure 12:
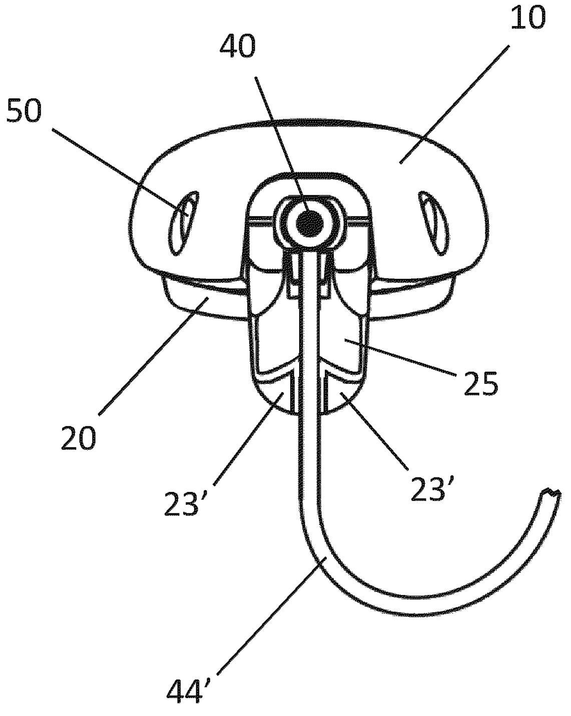
FIG. 12 is a front view of an alternative embodiment of a tool according to the invention.

FIG. 12 shows an alternative embodiment of the tool according to the invention. The stopper portion 23' is split into two sections to accommodate a tube portion 44' with a different shape than the tube portion in FIG. 10. The tube portion 44' has a straight section from the holding portion 42 of the ear-tip 40 over the guiding surface 25 passing between the two sections of the stopper portion 23'. Thus, different embodiments accommodating different shapes of tubes can be achieved.

REFERENCE SIGN LIST

- 1 tool for inserting an ear-tip of a hearing aid into an auditory canal of an end user
- 2 hearing aid
- 10 first part
- 11 first portion of first part
- 12 second portion of first part
- 20 second part
- 21 first portion of second part
- 22 second portion of second part
- 23 stopper portion
- 23 stopper portion
- 24 receiving gap
- 25 guiding surface
- 26 raised portion
- 30 cavity
- 32 recess in cavity
- 40 ear-tip
- 42 holding portion
- 42.1 largest side surface
- 42.2 long narrow side surface
- 44 tube portion of the ear-tip
- 44 tube portion of the ear-tip
- 46 protrusion of holding portion
- 50 pivot joint
- 51 circular hole
- 52 circular pivot element
- D direction of insertion
- L longitudinal axis
- B direction of release
- P basic plane
- A, A' direction of application of force for deflection of second section of second part
- X a first axis
- Y a second axis
- Z a third axis
- α cross-sectional area of cavity

The invention claimed is:

1. A tool for inserting an ear-tip of a hearing aid into an auditory canal of an end user, comprising a first part and a second part, wherein an end of the first part and an end of the second part form a cavity for receiving a holding portion of the ear-tip, the first part and the second part being arranged next to each other and being connected by means of at least one pivot joint, the at least one pivot joint defining a first portion and a second portion of both the first part and the second part, in that the first portions of the first part and the second part, respectively, extend from first ends comprising the cavity to the at least one pivot joint, and the second portions of the first part and the second part, respectively, extend from the at least one pivot joint to second ends opposite of the cavity along a longitudinal extension of the first part and the second part;

whereby the second portions of the first part and the second part are movable in relation to each other, and the first portions of the first part and the second part are movable in relation to each other, upon pressing the two second portions together in a direction perpendicular to the longitudinal extension of the first part and the second part, resulting in a pivotal movement via the at least one pivot joint, whereby the first portions of the first part and the second part forming the cavity are moved apart, thereby enlarging a cross-sectional area of the cavity to release the holding portion of the ear-tip from the cavity; and wherein at least the second portion of the second part is elastically deformable relative to the second portion of the first part so that, upon pressing the two second portions together in a direction perpendicular to the longitudinal extension of the first part and the second part, the second portion of the second part elastically deflects about the at least one pivot joint, thereby moving the first portion of the second part away from the first portion of the first part, while the second portion of the first part does not deflect.

2. The tool according to claim 1, wherein the first portions of the first part and the second part extend between 5 and 35% of the total length of the longitudinal extension of the first part and the second part.

3. The tool according to claim 1, whereby at least one of the first part and the second part comprises a stopper portion, which is arranged outside of the cavity.

4. The tool according to claim 1, wherein one of the first or second parts comprises a receiving gap, whereby the receiving gap extends between the cavity and at least one stopper portion, and whereby the receiving gap is suitable for receiving a tube portion of the ear-tip.

5. The tool according to claim 4, whereby the at least one stopper portion comprises a guiding surface for guiding the tube portion of the ear-tip.

6. The tool according to claim 1, wherein the cavity is adapted to hold the holding portion of the ear-tip in such a way that the holding portion is supported in all three dimensions defined by a first axis X, a second axis Y and a third axis Z.

7. The tool according to claim 1, whereby the cavity has a rectangular shape.

8. The tool according to claim 7, whereby an edge of the rectangular shape is rounded.

9. The tool according to claim 1, whereby the cavity comprises at least one recess for receiving a protrusion, which is arranged on the holding portion of the ear-tip.

10. The tool according to claim 1, wherein a force needed for pressing together the second portions of the first part and the second part, thereby releasing the holding portion of the ear-tip from the cavity, is 5-20 N.

11. The tool according to claim 10, wherein the cross-sectional area α of the cavity is enlarged by 50-150% upon application of said force.

12. The tool according to claim 10, wherein the cross-sectional area α of the cavity is enlarged by 70-100% upon application of said force.

13. The tool according to claim 10, the second part is an integral one-piece construction extending from the first end to the second end of the second part and in a non-deformed relaxed state prior to pressing the two second portions together in a direction perpendicular to the longitudinal extension of the first part and the second part.

14. The tool according to claim 1, wherein the first part or the second part comprises a raised portion.

15. Set for inserting an ear-tip in an auditory canal of an end user, comprising an ear-tip, having a holding portion; and the tool according to claim 1.

16. The set according to claim 15, wherein the form of the holding portion matches into the shape of the cavity.

17. The tool according to claim 1, wherein the first portions of the first part and the second part extend between 10 and 30% of the total length of the longitudinal extension of the first part and the second part.

18. The tool according to claim 1, wherein a force needed for pressing together the second portions of the first part and the second part, thereby releasing the holding portion of the ear-tip from the cavity, is 10-17 N.

19. A tool for inserting an ear-tip of a hearing aid into an auditory canal of an end user, comprising a first part and a second part, wherein an end of the first part and an end of the second part form a cavity for receiving a holding portion of the ear-tip, the first part and the second part being arranged next to each other and being connected by means of at least one pivot joint, the at least one pivot joint defining a first portion and a second portion of both the first part and the second part, in that the first portions of the first part and the second part, respectively, extend from first ends comprising the cavity to the at least one pivot joint, and the second portions of the first part and the second part, respectively, extend from the at least one pivot joint to second ends opposite of the cavity along a longitudinal extension of the first part and the second part;

whereby the second portions of the first part and the second part are movable in relation to each other, and the first portions of the first part and the second part are movable in relation to each other, upon pressing the two second portions together in a direction perpendicular to the longitudinal extension of the first part and the second part, resulting in a pivotal movement via the at least one pivot joint, whereby the first portions of the first part and the second part forming the cavity are moved apart, thereby enlarging a cross-sectional area of the cavity to release the holding portion of the ear-tip from the cavity;

wherein at least the second part is an elastically deformable member so that, upon pressing the two second portions together in a direction perpendicular to the longitudinal extension of the first part and the second part, the second part elastically deforms about the at least one pivot joint, thereby moving the first portion of the second part away from the first portion of the first part; and wherein the second part is arranged within the perimeter of the first part, and wherein a relative movement of the first part and the second part is achieved by the deflection of the second part within the first part.

* * * * *